(12) United States Patent
Park

(10) Patent No.: US 9,015,584 B2
(45) Date of Patent: Apr. 21, 2015

(54) MOBILE DEVICE AND METHOD FOR CONTROLLING THE SAME

(71) Applicant: LG Electronics Inc., Seoul (KR)

(72) Inventor: Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 13/742,100

(22) Filed: Jan. 15, 2013

(65) Prior Publication Data
US 2014/0082489 A1  Mar. 20, 2014

(30) Foreign Application Priority Data

Sep. 19, 2012 (KR) .................. 10-2012-0103782

(51) Int. Cl.
*G06F 3/00* (2006.01)
*G06F 3/0488* (2013.01)
*G06F 1/16* (2006.01)
*G06F 9/44* (2006.01)
*G06F 3/01* (2006.01)
*G06F 3/0481* (2013.01)

(52) U.S. Cl.
CPC ............ *G06F 3/0488* (2013.01); *G06F 1/1626* (2013.01); *G06F 9/4443* (2013.01); *G06F 3/016* (2013.01); *G06F 3/04817* (2013.01)

(58) Field of Classification Search
USPC ........................................................ 715/702
See application file for complete search history.

(56) References Cited

U.S. PATENT DOCUMENTS

| | | | | |
|---|---|---|---|---|
| 5,754,178 A | * | 5/1998 | Johnston et al. ............... | 715/769 |
| 6,181,344 B1 | * | 1/2001 | Tarpenning et al. .......... | 715/863 |
| 7,562,241 B2 | * | 7/2009 | Nurmi ........................... | 713/323 |
| 7,730,401 B2 | | 6/2010 | Gillespie et al. | |
| 7,913,185 B1 | * | 3/2011 | Benson et al. ................ | 715/808 |
| 2001/0039552 A1 | * | 11/2001 | Killi et al. .................... | 707/500 |
| 2003/0038776 A1 | * | 2/2003 | Rosenberg et al. ........... | 345/156 |
| 2004/0001073 A1 | * | 1/2004 | Chipchase .................... | 345/619 |
| 2005/0160368 A1 | * | 7/2005 | Liu et al. ....................... | 715/762 |
| 2006/0089843 A1 | * | 4/2006 | Flather .............................. | 705/1 |
| 2006/0090164 A1 | | 4/2006 | Garden et al. | |
| 2006/0253794 A1 | * | 11/2006 | Wilson .......................... | 715/779 |
| 2007/0013665 A1 | | 1/2007 | Vetelainen et al. | |
| 2007/0150842 A1 | * | 6/2007 | Chaudhri et al. ............. | 715/863 |
| 2009/0122018 A1 | * | 5/2009 | Vymenets et al. ............ | 345/173 |
| 2009/0140992 A1 | * | 6/2009 | Tolaio ........................... | 345/173 |
| 2009/0307631 A1 | * | 12/2009 | Kim et al. ..................... | 715/830 |
| 2010/0053087 A1 | | 3/2010 | Dai et al. | |
| 2010/0083190 A1 | * | 4/2010 | Roberts et al. ............... | 715/863 |
| 2010/0092930 A1 | * | 4/2010 | Fletcher et al. .............. | 434/178 |
| 2010/0107125 A1 | * | 4/2010 | Ockene et al. ............... | 715/838 |
| 2010/0235771 A1 | * | 9/2010 | Gregg, III .................... | 715/769 |

(Continued)

*Primary Examiner* — Ryan Pitaro
(74) *Attorney, Agent, or Firm* — Birch, Stewart, Kolasch & Birch, LLP

(57) ABSTRACT

A mobile device for providing a shortcut in the form of tactile feedback based on a user touch input and a method controlling the same are discussed. According to an embodiment, the method includes displaying a user interface; receiving a first touch input to the user interface for selecting an item from the displayed interface, wherein the first touch input is for setting a shortcut interface of the selected item; displaying a virtual image corresponding to the selected item in a first region based on the first touch input; receiving a second touch input to the user interface for moving the virtual image from the first region to a second region or for selecting the second region; and setting the shortcut interface of the selected item at the second region based on the second touch input.

24 Claims, 18 Drawing Sheets

(56) References Cited

U.S. PATENT DOCUMENTS

| | | |
|---|---|---|
| 2010/0257447 A1* | 10/2010 | Kim et al. .................... 715/702 |
| 2010/0279738 A1 | 11/2010 | Kim et al. |
| 2011/0047461 A1* | 2/2011 | Bargmann ................... 715/702 |
| 2011/0145049 A1* | 6/2011 | Hertel et al. ............... 705/14.23 |
| 2011/0157027 A1 | 6/2011 | Rissa |
| 2012/0311710 A1* | 12/2012 | Butler et al. .................... 726/24 |
| 2013/0024819 A1* | 1/2013 | Rieffel et al. ................. 715/848 |
| 2013/0074000 A1* | 3/2013 | Liu et al. ....................... 715/781 |
| 2013/0082937 A1* | 4/2013 | Liu et al. ....................... 345/173 |

* cited by examiner

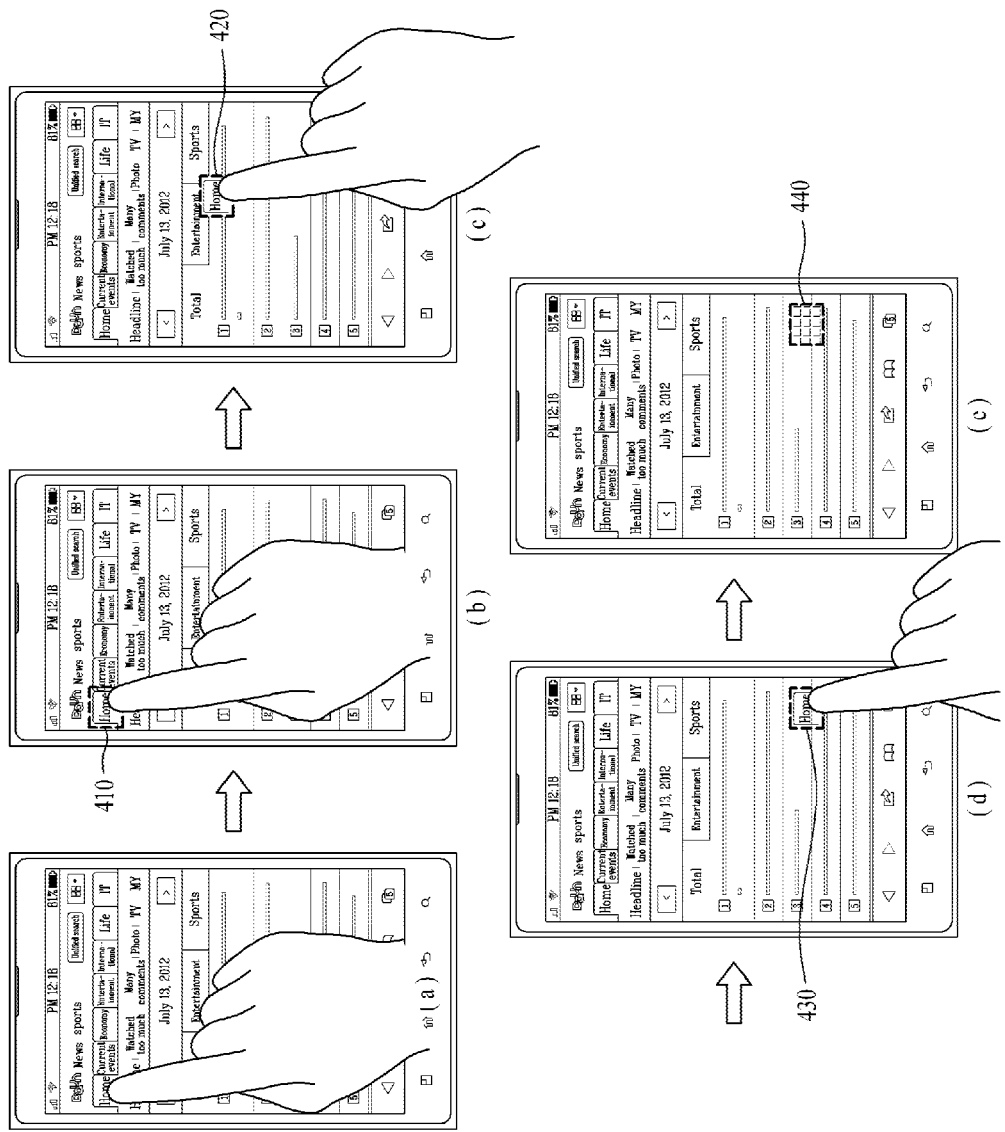

MOBILE DEVICE AND METHOD FOR CONTROLLING THE SAME

This application claims the priority benefit of Korean Patent Application No. 10-2012-0103782 filed on Sep. 19, 2012, which is hereby incorporated by reference as if fully set forth therein.

BACKGROUND OF THE INVENTION

1. Field of the Invention

The present invention relates to a mobile device and a method for controlling the same and, more particularly, to a mobile device for providing a shortcut in the form of tactile feedback in correspondence with a user's touch input, and a method for controlling the same.

2. Discussion of the Related Art

Recently, as information communication technologies and semiconductor technologies have been developed, various mobile devices have been rapidly diffused and widely used. In particular, as mobile phones have evolved into smart phones, an Internet function, etc. may be performed in addition to a function for transmitting and receiving a call.

As mobile devices have been widely used and various functions are installed in the mobile devices, a user may perform a desired operation anytime and anywhere. For example, a user may perform various operations such as e-mail checking, banking or gaming anytime anywhere.

As the number of operations performed by the user using the mobile device is increased, the size of the display of the mobile device is gradually increased in order to reduce inconvenience occurring due to the small size of the mobile device.

FIG. 1 shows an example of using a mobile device 100 according to a related art. As the size of the display of the mobile device 100 is increased, there are a region 120 which can be easily touched by one hand 10 of a user holding the mobile device 100 and a region 110 which is difficult to touch by the hand 10 when the user manipulates the mobile device 100.

In general, the user manipulates the mobile station using one hand or both hands. However, most users control the mobile device using one hand except for maybe a text input operation. Accordingly, when the mobile device is being manipulated using one hand, there is a region which is not easily accessible or can be touched by the same hand/finger as shown in FIG. 1, which restricts the user's operation of the mobile device.

SUMMARY OF THE INVENTION

Accordingly, the present invention is directed to a mobile device and a method for controlling the same that substantially obviate one or more problems due to limitations and disadvantages of the related art.

An object of the present invention is to provide a mobile device capable of being manipulated using one hand regardless of the size of a display of the mobile device.

Another object of the present invention is to provide a mobile device for providing a shortcut in order to control an item displayed in a region which is not easily touchable or selectable by a user's hand holding the mobile device.

A further object of the present invention is to provide a mobile device for providing a shortcut in the form of tactile feedback in correspondence with a user's touch input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment a method for controlling a mobile device includes displaying a user interface including at least one item; receiving a first touch input for selecting an item, the first touch input being an input for setting a shortcut interface and the shortcut interface providing a shortcut for the selected item; providing a virtual image corresponding to the selected item to a first region, the virtual image being displayed such that an image corresponding to the selected item is distinguished from peripheral graphic images; receiving a second touch input for moving the virtual image from the first region to a second region; and setting a shortcut interface corresponding to the selected item in the second region, the shortcut interface being invisible and providing a tactile feedback in correspondence with third touch input.

According to another aspect of the present invention, a mobile device includes a controller configured to control an operation of the mobile device; a display unit configured to output an image based on a command of the controller; a sensor unit configured to detect a touch input; and a tactile feedback unit configured to provide a tactile feedback in correspondence with the touch input, wherein the mobile device is configured to display a user interface including at least one item; receive a first touch input for selecting the item, the first touch input being an input for setting a shortcut interface and the shortcut interface providing a shortcut for the selected item; provide a virtual image corresponding to the selected item to a first region, the virtual image being displayed such that an image corresponding to the selected item is distinguished from peripheral graphic images; receive a second touch input for moving the virtual image from the first region to a second region; and setting a shortcut interface corresponding to the selected item in the second region, the shortcut interface being invisible and providing a tactile feedback in correspondence with third touch input.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram showing an embodiment of setting a shortcut interface in a mobile device according to the present invention;

DETAILED DESCRIPTION OF THE PREFERRED EMBODIMENTS

In addition, although the terms used in the embodiments of the present invention are selected from generally known and used terms, some of the terms mentioned in the description of the present invention have been selected by the discretion of the applicant, the detailed meanings of which are described in relevant parts of the description herein. Furthermore, it is required that the present invention is understood, not simply by the actual terms used but by the meanings of each term lying within.

Although the embodiments of the present invention will be described in detail with reference to the drawings, the present invention is not limited to the embodiments.

The mobile device described in the present specification is a portable device for sensing users' touch inputs and can include, for example, a tablet personal computer (PC), a mobile terminal, a mobile phone, a smart phone, a remote controller, a personal digital assistant (PDA), a portable electronic device with a display which is capable of carrying out one or more user-initiated operations, etc.

Figure 1:
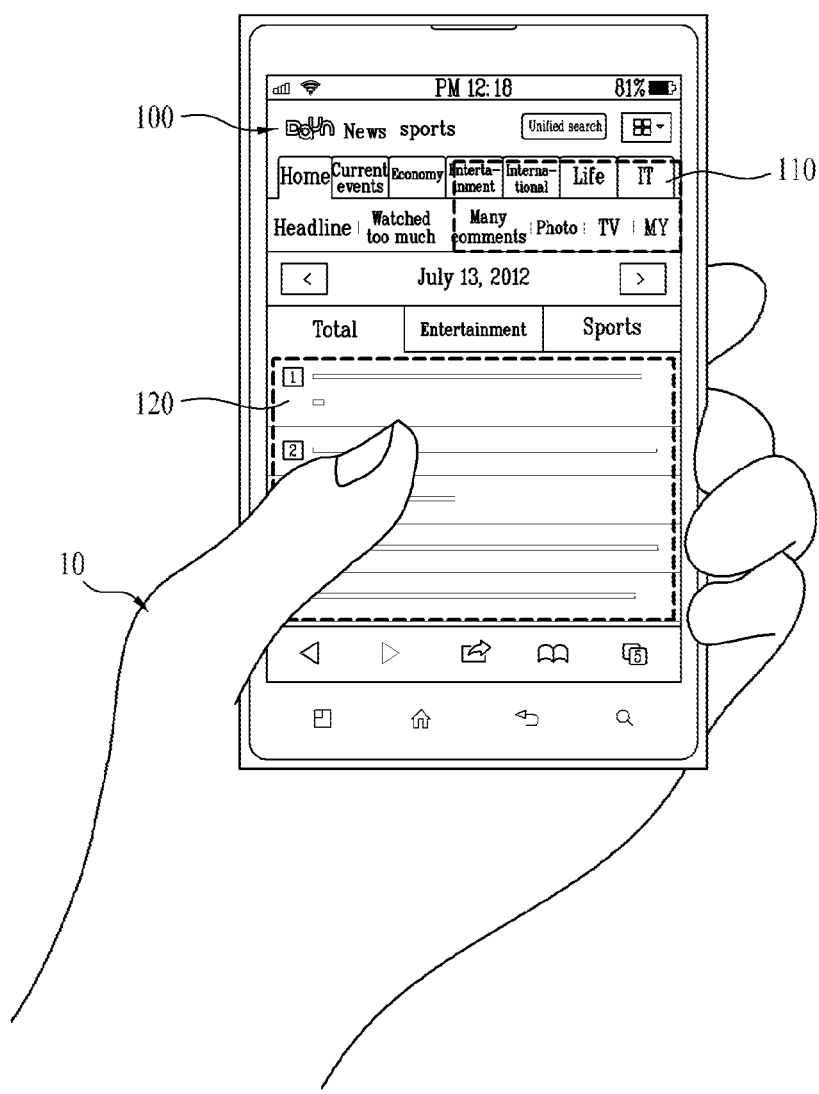
FIG. 1 is a diagram showing an example of using a mobile device according to a related art.
Figure 2:
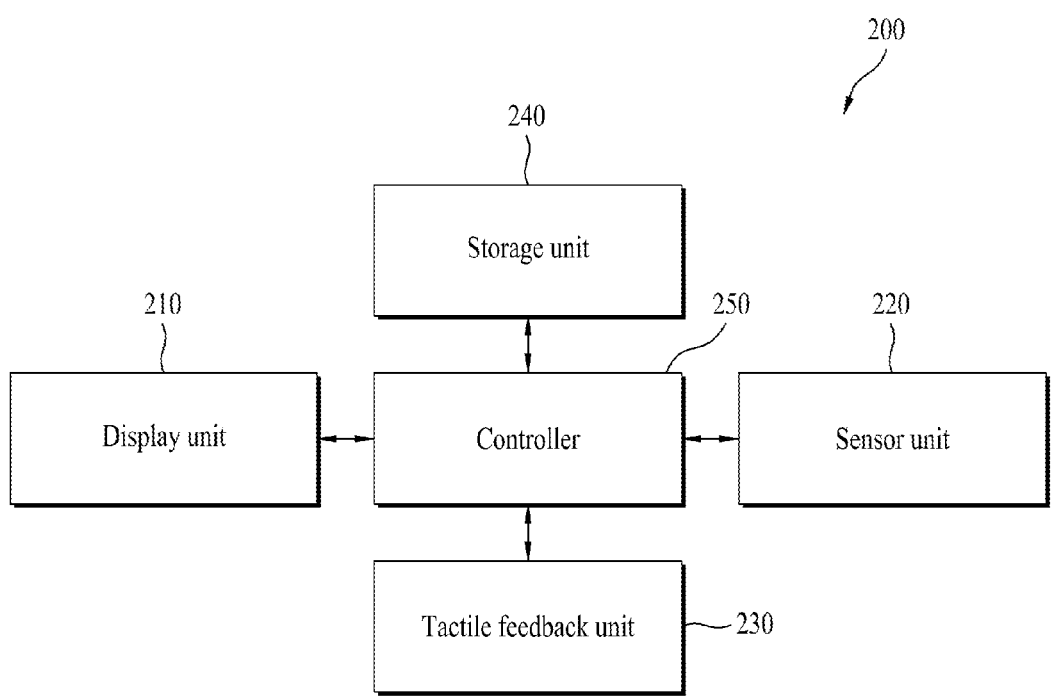
FIG. 2 is a block diagram of a mobile device according to an embodiment of the present invention.

FIG. 2 is a block diagram of a mobile device according to an embodiment of the present invention. FIG. 2 shows an embodiment of the present invention and some components may be omitted or new/other component(s) may be added.

As shown in FIG. 2, a mobile device 200 of the present invention may include a display unit 210, a sensor unit 220, a tactile feedback unit 230, a storage unit 240 and a controller 250. All components of the mobile device 200 are operatively coupled and configured.

The display unit 210 includes a display screen and outputs an image on the display screen. Accordingly, the display unit 210 may output an image based on a control command of the controller 250 or contents executed by the controller 250.

The sensor unit 220 may send information on an environment recognized by the mobile device 200 or user input to the controller 250 using a plurality of sensors mounted in the mobile device 200, and may include a plurality of sensing parts.

The plurality of sensing parts can include one or more of the following: a gravity sensor, a geomagnetic sensor, a motion sensor, a gyro sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, etc.

The sensor unit 210 includes the above-described sensing parts, senses various user inputs and user environments and sends a sensed result to the controller 250 such that the controller 250 performs an appropriate operation based on the received information.

The above-described sensors may be included in the mobile device 200 as separate elements and may be combined into one or more elements.

The sensor unit 220 may sense a user's touch input and the display unit 210 may detect the user's touch input. For example, if the display unit 210 is a touch sensitive display, the display unit 210 may be used as a touch sensor. Accordingly, the display unit may detect the user's touch input to the display unit and send the same to the controller 250.

The tactile feedback unit 230 may provide one or more tactile feedbacks to the user (e.g., to the user's user finger or stylus which touches the display unit 210) using ultrasonic vibrations. The tactile feedback unit 230 may control a vibration frequency and vibration level of the tactile feedback and thus control the frictional force between the user's finger and the display unit 210. Hereinafter, for convenience of description, it is assumed that the tactile feedback unit 230 provides the tactile feedback to the user's finger. For instance, when the user touches a particular area on the display screen by using the user's finger, the user's finger feels the tactile feedback such as the vibration associated with or generated from the particular area. The tactile feedback can be vibrations, texture information, etc.

The display unit 210 may provide the tactile feedback to the user in association with the tactile feedback unit 230. The display unit 210 may include a flexible display.

The storage unit 240 may store a variety of digital data such as video, audio, photos, moving images, applications, etc. The storage unit 240 includes various digital data storage spaces such as a flash memory, a hard disk drive (HDD), a solid state drive (SSD), etc.

The mobile device 200 according to the present invention may store a displayed item and link information or execution information of the item in the storage unit 240. The storage unit 240 may be selectively included according to the design of the mobile device 240.

Although not shown in FIG. 2, the mobile device 200 according to the present invention may further include a communication unit, an audio input/output unit, a power unit, other user input units, etc.

The communication unit may perform communication with an external device using a variety of protocols and transmit and receive data. In addition, the communication unit may be connected to an external network or server by wire or wirelessly to transmit digital data such as contents. The communication unit may be selectively included according to the design of the mobile device.

The audio input/output unit can include an audio output part such as a speaker and an earphone and an audio input part such as a microphone and may perform audio output and input of the mobile device. At this time, the audio input/output unit may be used as an audio sensor and may be selectively included according to the design of the mobile device.

The power unit can be a battery mounted in the mobile device and/or a power source connected to external power source and may supply power to the mobile device 200.

The mobile device 200 according to the present invention may provide a shortcut interface for at least one item displayed on the mobile device, which will be described in detail with reference to FIGS. 3A to 15D. These figures depict various examples of the display screen of the mobile device 200 or other mobile devices.

The mobile device according to the present invention displays a user interface including at least one item through the display unit of the mobile device. At this time, the item may include at least one of icons corresponding to hypertext and applications.

Figure 3A:
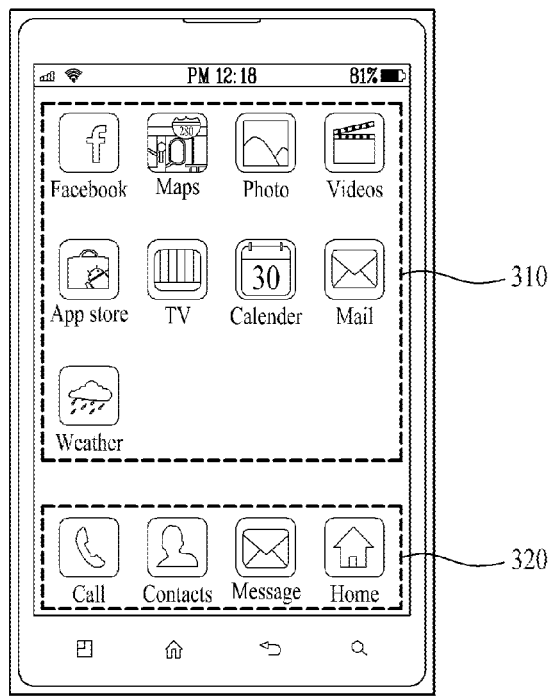
FIG. 3A is a diagram showing an example of an item displayed on a mobile device according to the present invention.

FIG. 3A is a diagram showing an example of an item displayed on a mobile device according to the present invention. As shown in FIG. 3A, the item may be an icon 310 corresponding to applications and an icon 320 for functions performed by the mobile device.

Figure 3B:
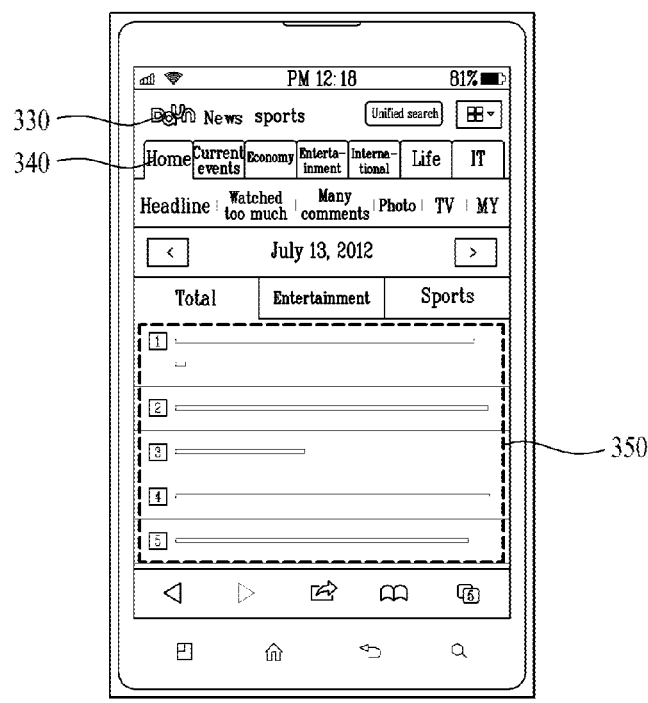
FIG. 3B is a diagram showing another example of an item displayed on a mobile device according to the present invention.

FIG. 3B is a diagram showing another example of an item displayed on a mobile device according to the present invention. As shown in FIG. 3B, the item may include hypertexts 330, 340 and 350.

Hypertext is a text data file in which phrases or words of sentences and headwords are associated with each other and is used for an efficient information search in a network in which nodes are connected.

The mobile device may use the Internet or other network due to support of a wired or wireless Internet/network function. At this time, hypertext on a web page may be used.

Accordingly, as shown in FIG. 3B, the item displayed on the mobile device may include the hypertext 330 linked to the address of a frequently visited site, the hypertext 340 linked to a main screen of a frequently visited site and the hypertext 350 linked to the content of an article as a table of contents of articles on a site.

The mobile device according to the present invention provides a shortcut interface for the above-described item. In general, the shortcut refers to a path between two points that is faster than the commonly used paths and may save time as compared to a commonly used method.

Accordingly, the mobile device according to the present invention provides a shortcut interface so as to enable a user to easily and rapidly access an icon corresponding to hypertext, an application or a specific function.

Therefore, the user may easily and rapidly execute the item via the shortcut interface for a frequently used icon or hypertext without regard to time, place and an application which is currently being executed.

A method of setting a shortcut interface in a mobile device according to an embodiment of the present invention will be described in detail with reference to FIGS. 4 to 6.

First, FIG. 4 is a diagram showing an embodiment of setting a shortcut interface in a mobile device according to the present invention.

As shown in FIG. 4(*a*), the mobile device may receive a touch input (from a user of the mobile device) for selecting an item displayed on the display screen of the mobile device. In the example of FIG. 4(*a*), a hypertext (e.g., a Home icon) present on a web page is the selected item.

As shown in FIG. 4(*b*), the mobile device then provides a virtual image corresponding to the selected item at a first region 410 of the display screen. The virtual image may be a highlighted item image or a bright item image corresponding to the selected item such that the user becomes aware that the item has been selected. For instance, the Home icon selected may be duplicated and the duplicate Home icon may be displayed as the virtual image in the first region 410 or the Home icon as highlighted or otherwise indicated may be displayed in the first region 410. The first region 410 may be a location where the item may be present as shown in FIG. 4(*b*) or a specific location within a predetermined range of the item.

Since the shortcut interface provided by the present invention is preferably invisible, it is necessary to display where the shortcut interface is set. Accordingly, the mobile device may indicate the location of the shortcut interface of the selected item via this virtual image.

As shown in FIGS. 4(*c*) to 4(*d*), the mobile device may receive the user's touch input for moving the virtual image (corresponding to the selected item) from the first region 410 to a second region 430 on the display screen. As shown in FIG. 4(*c*), if the touch input for moving the virtual image 420 from the first region 410 to the second region 430 is a drag and drop/release input, the mobile device moves the virtual image 420 in correspondence with the user's touch & drag path and displays the virtual image at the moved location 430. Accordingly, the user may confirm where the shortcut interface will be set via the virtual image of the selected item visibly displayed on the display screen.

As shown in FIG. 4(*e*), if the user's touch input such as a drag and drop of the virtual image 420 is completed at the second region 430, the mobile device sets a shortcut interface 440 of the selected item at the same second region 430. The set shortcut interface 440 of the selected item (i.e., Home icon) corresponding to the virtual image 420 is invisible to the user. For instance, once the shortcut interface 440 of the selected item is set at a specific location on the display screen, that shortcut interface becomes invisible to the user. However, the shortcut interface is shown in FIG. 4(*e*) only for better understanding of description. The set shortcut interface according to an embodiment of the present invention provides only a tactile feedback in correspondence with the user's touch input and is invisible to the user.

As shown in FIG. 4, if the location of the shortcut interface of the selected item is decided by the user's touch input such as a drag and drop input, the shortcut interface can be easily located and moved to a location desired by the user. The present invention is beneficially especially in cases where the selected item is an item that is generally not touchable/selectable by a finger of the user's hand when the user is holding the mobile device by the same hand.

That is, the present invention provides the shortcut interface for easily controlling an item which is not easily touchable by a user's hand when the user uses the mobile device using the same hand. Accordingly, since the user may directly set and change the location of the shortcut interface to a convenient location, it is possible to increase the user convenience when using the mobile device.

Figure 5:
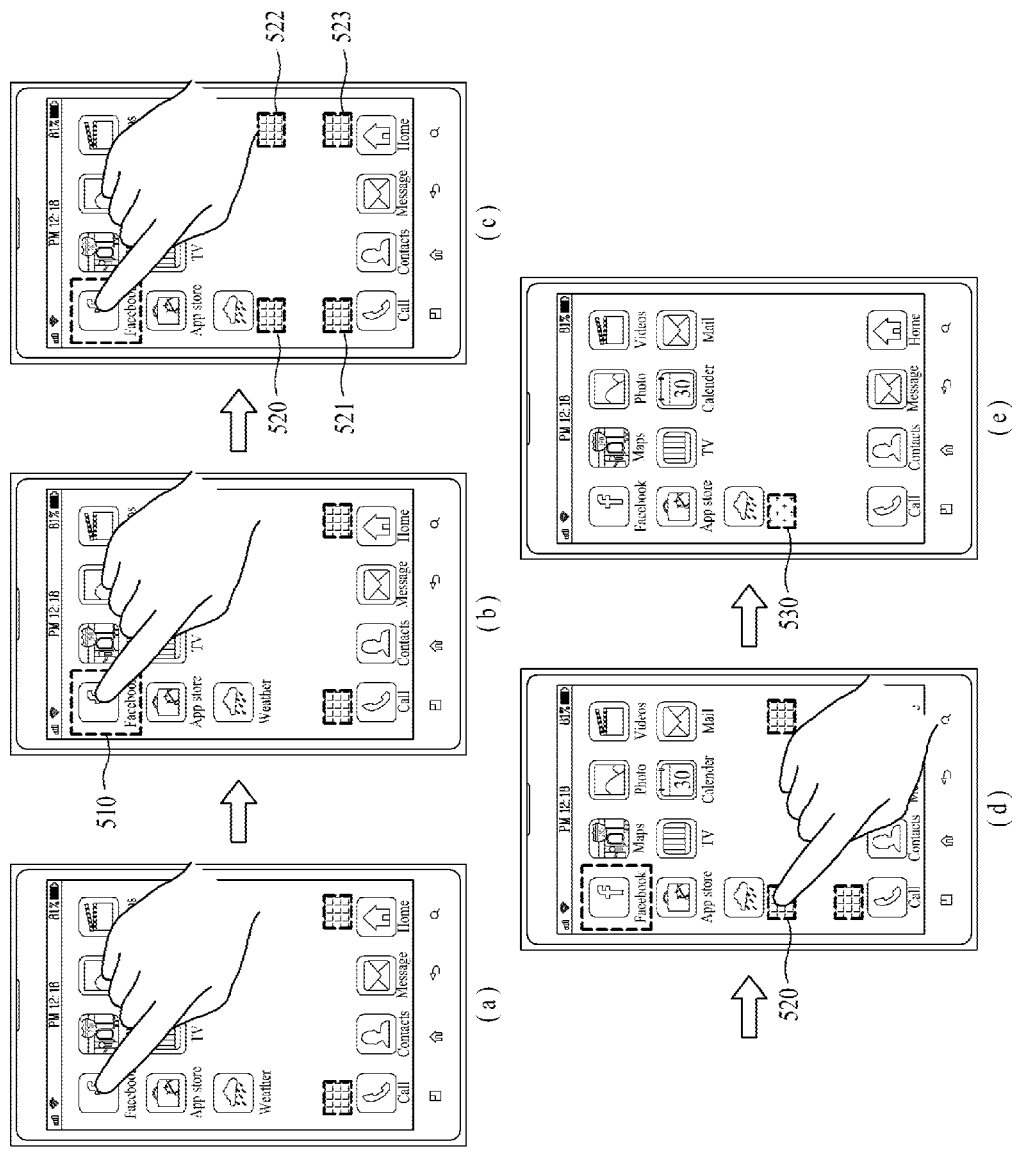
FIG. 5 is a diagram showing another embodiment of setting a shortcut interface in a mobile device according to the present invention.

FIG. 5 is a diagram showing another embodiment of setting a shortcut interface in a mobile device according to the present invention.

As shown in FIG. 5(a), the mobile device may receive a user's touch input for selecting an item displayed on the display screen of the mobile device. In FIG. 5(a), an icon corresponding to an application (e.g., Facebook) is shown as the selected item.

A touch input by the user for selecting an item may be changed in a predetermined manner. For example, the mobile device may recognize a touch input for selecting an item displayed when the item is touched and then is held in a state of being touched for a predetermined time. Alternatively, the mobile device may recognize a touch input for selecting an item if an item is present in a region, such as a circular or rectangular region, which is set or drawn by the touch input. The mobile device may recognize a touch input for touching an item to be selected predetermined times as the touch input for selecting the item.

The method of recognizing a touch input for selecting an item by the mobile device may be changed in a predetermined manner and the touch input for selecting an item is not limited to a specific form.

As shown in FIG. 5(b), the mobile device provides a virtual image corresponding to the selected item to a first region 510 on the display screen. The virtual image may include a highlighted item image and/or a bright item image of the selected item or can be a duplicate of the selected item such that the user becomes aware that the item has been selected.

After the item is selected and the virtual image of the selected item is displayed, then as shown in FIG. 5(c), the mobile device may display one or more regions 520, 521, 522 and 523 capable of setting a shortcut interface therein. Here, the region capable of setting the shortcut interface therein may be predetermined and the number of regions may be one or more.

As a variation, when the mobile device displays at least one region capable of setting the shortcut interface therein as shown in FIG. 5(c), the displayed region may be changed according to a method of gripping the mobile device by the user, because a region which can be easily manipulated by the user may differ depending on the method of gripping the mobile device by a specific user.

For example, when the user grips the mobile device with the user's right hand and touches the mobile device using the thumb of the right hand, the mobile device may display only the right regions 522 and 523 as the region capable of setting the shortcut interface therein in FIG. 5(c). On the other hand, when the user grips the mobile device with the user's left hand and touches the mobile device using the thumb of the left hand, the mobile device may display only the left regions 520 and 521 as the region capable of setting the shortcut interface therein in FIG. 5(c). This further enhances the use of the shortcut interface since the shortcut interface would be set in a region that is easily accessible by a finger of the user's hand holding the mobile device.

As shown in FIG. 5(d), the user may select a specific region 520 from among the regions 520, 521, 522 and 523 capable of setting the shortcut interface therein. Here the mobile device may recognize the touch input for selecting the second region 520 as the input for moving the virtual image from the first region 510 to the selected second region 520 and display the virtual image at the second region 520.

If the user sets the region in which the shortcut interface will be set, as shown in FIG. 5(e), the mobile device sets the shortcut interface 530 in the set second region 520. Here, the shortcut interface is shown in FIG. 5(e) only for better understanding of description. However, the shortcut interface only provides a tactile feedback in correspondence with the user's touch input and is invisible to the user. That is, the shortcut interface of the selected item which has been set in the specific region of the display screen is not visible to the user, and may only provide a tactile feedback in response to the user's touch of the shortcut interface.

As shown in FIG. 5, the mobile device may display or suggest one or more regions in which the shortcut interface may be set and the user may select a specific region, in which the shortcut interface will be set, from among the displayed regions. If the region in which the shortcut interface may be set is predetermined in the mobile device, it is possible to provide a convenient region to the user according to the method of gripping the mobile device by the user and to provide a region which does not overlap other items displayed on the mobile device.

Figure 6:
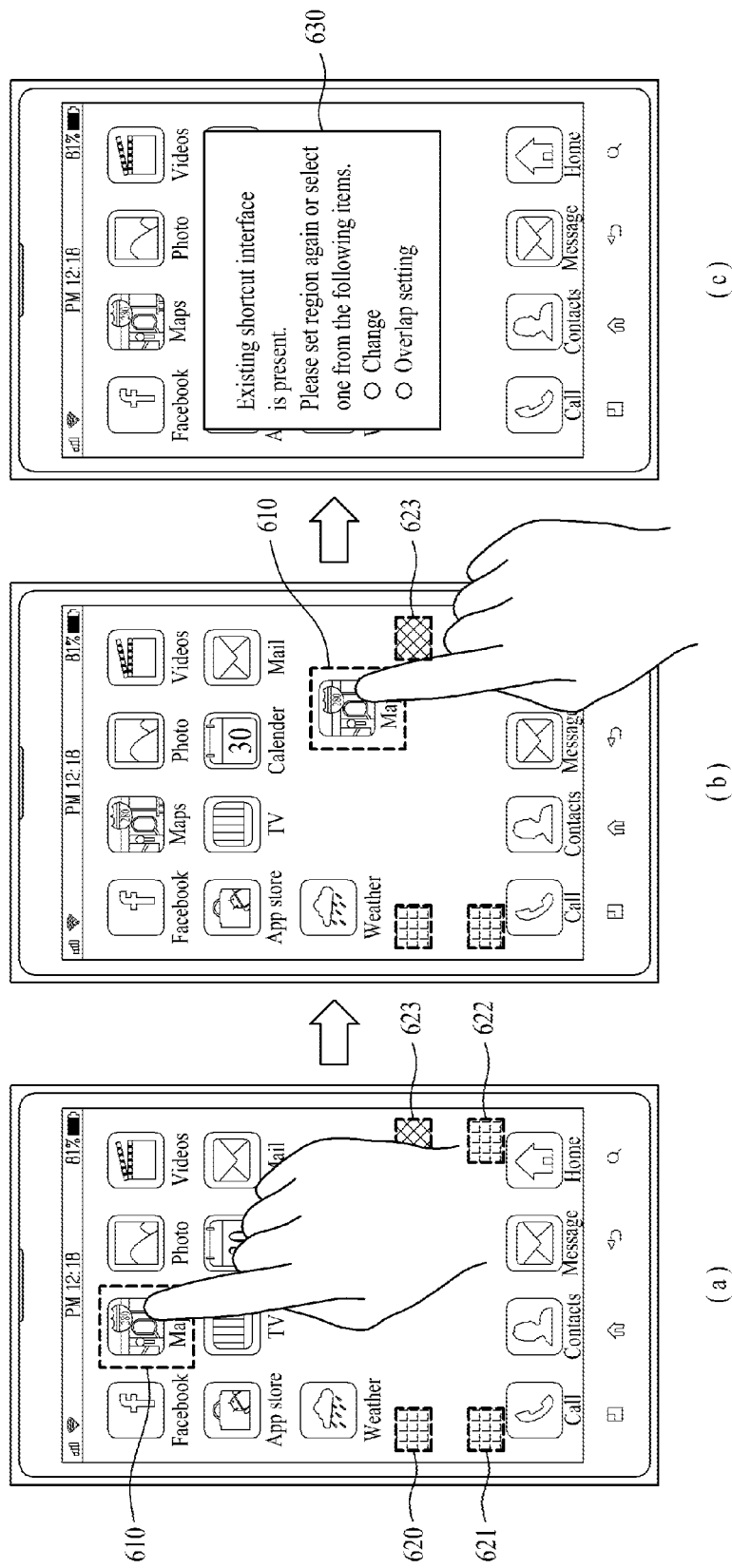
FIG. 6 is a diagram showing another embodiment of setting a shortcut interface in a mobile device according to the present invention.

FIG. 6 is a diagram showing another embodiment of setting a shortcut interface in a mobile device according to the present invention, which shows the case where a region in which the shortcut interface is to be set overlaps a region in which the shortcut interface has already been set.

As shown in FIG. 6(a), if the user selects an item (e.g., Maps icon) for which the shortcut interface will be set, the mobile device may display a virtual image 610 corresponding to the selected item. The mobile device may display regions 620, 621 and 622 in which the shortcut interface of the selected item may be set and a region 623 in which a shortcut interface of another item has already been set.

The user may select a specific region from among the regions 620, 621 and 622 provided by the mobile device and locate the virtual image 610 in the specific region via a touch input such as a drag and drop input. As a result, the mobile device may set the shortcut interface corresponding to the selected item in the region selected by the user.

In contrast, as shown in FIG. 6(b), the user may move the virtual image 610 of the currently selected item (Maps icon) to the region 623 in which the shortcut interface of another item has already been set, via a touch input such as a drag and drop input. In this case, as shown in FIG. 6(c), the mobile device may display a guide message box 630 to the user. The mobile device may receive, from the user, a selection input for changing the setting of the shortcut interface of the currently selected item or a selection input for setting the shortcut interface of the currently selected item to overlap the already set shortcut interface of another item in the same region via the guide message box 630. If the user selects the changing setting, then the user can select a different region for setting the shortcut interface of the currently selected item therein. If the user selects the overlap setting, the mobile device may alternately provide different tactile feedbacks at a predetermined time interval in correspondence to the user touch input for the shortcut interface. For instance, different tactile feedbacks corresponding to the previously set shortcut interface and the currently set shortcut interface may be generated alternatively or at different times as the user touches the same region where the two shortcut interfaces are set. These shortcut interfaces, however, are not visible to the user.

If the shortcut interface is set via the process of FIGS. 4 to 6, the mobile device may detect a user's touch input in the region in which the shortcut interface is set and provide a tactile feedback in response to the user's touch input. That is, the mobile device provides different textures or feel when the user touches the region in which the shortcut interface is set. Accordingly, although the user cannot see the shortcut interface, the user can easily feel and confirm the region in which the shortcut interface is set via the tactile feedback.

According to an embodiment, when the shortcut interface of the selected item is set, texture information for a tactile feedback of the shortcut interface may be set to a predetermined value in the mobile device. Alternatively, the user may set texture information of a tactile feedback provided by the shortcut interface.

The texture information may include information about a vibration frequency and vibration level set for controlling the frictional force between the user's finger and the display unit of the mobile device. The mobile device may provide a tactile feedback in correspondence with the user's touch input using the texture information set per each shortcut interface. That is, the same texture information can be used all the shortcut interfaces set according to the present invention, or different texture information can be used respectively for different shortcut interfaces set according to the present invention.

Figure 7:
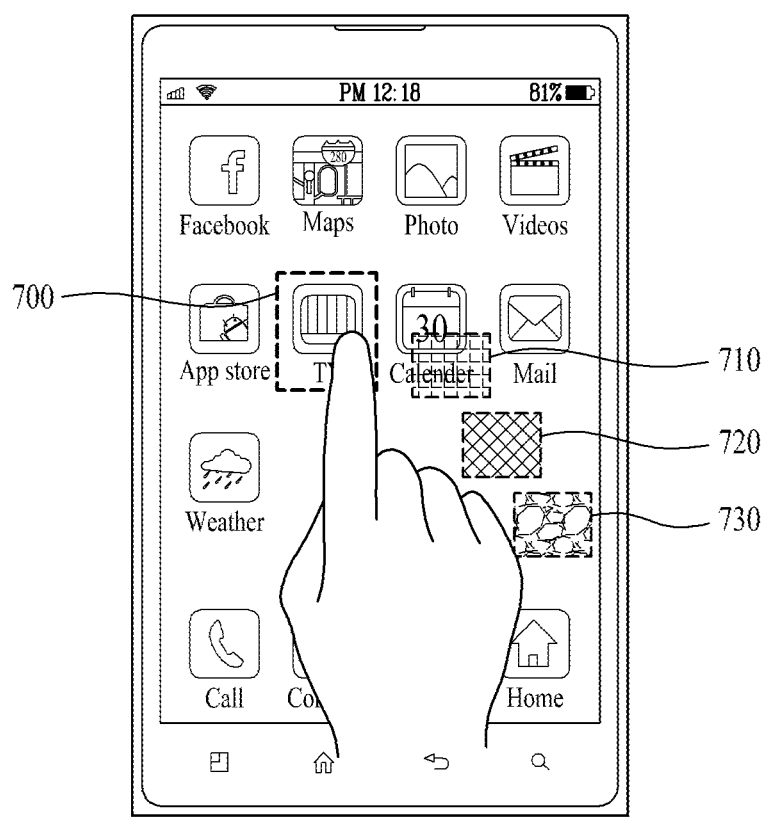
FIG. 7 is a diagram showing an embodiment of setting texture information in the case where a shortcut interface is set in a mobile device according to the present invention.

FIG. 7 is a diagram showing an embodiment of setting texture information in the case where a shortcut interface is being set in a mobile device according to the present invention.

As shown in FIG. 7, the mobile device may display a list of predetermined texture information when the user is setting or has set the shortcut interface of an item displayed on the screen of the mobile device. For example, when the user selects an item 700 for which the shortcut interface will be set, the mobile device may also display a downy image 710 for providing soft texture information (soft tactile feedback), a tree image 720 for providing rough texture information (rough tactile feedback) and a gravel image 730 for providing uneven texture information (uneven tactile feedback). The user can then select one of the images 710, 720, 730 to select the specific tactile feedback/texture information for the shortcut interface being set up.

Once the user selects a specific image representing specific texture information, the mobile device sets or uses the selected texture information to provide a tactile feedback corresponding to the selected texture information and thereby provides the tactile feedback corresponding to the set texture information of the specific image when the user touches the set shortcut interface of the selected item. As a result, the user can feel and change the tactile feedback according to the user's preference in association with the specific shortcut interface.

When the user selects a specific image from a list of images representing a plurality of different texture information, the mobile device sets the texture information corresponding to the specific image as the texture information of the shortcut interface being set or previously set. As a variation, instead of providing the list of selectable images, other means to select specific texture information may be used.

The mobile device may set texture information of a tactile feedback for the shortcut interface to predetermined texture information according to at least one of pressure and speed of a drag input for moving a virtual image from a first region to a second region by the user, instead of displaying the image representing the texture information.

For example, if the user drags and moves a virtual image of the selected item from the first region to the second region at a high speed or presses the virtual image with high pressure, the texture information of the tactile feedback for that shortcut interface may be set such that the user feels roughness when the user touches the shortcut interface. If the user drags and moves the virtual image from the first region to the second region at a low speed or presses the virtual image with low pressure, the texture information of the tactile feedback may be set such that the user feels softness when the user touches the shortcut interface.

If setting of the shortcut interface is finished, the mobile device may detect the user's touch input for activating the set shortcut interface. The mobile device may provide a tactile feedback set with respect to the shortcut interface in correspondence with the detected touch input. If the mobile device detects the user's touch input after or while providing the tactile feedback, an operation according to the item corresponding to the shortcut interface may be executed. That is, the shortcut operation for the item is executed when the user touches the set shortcut interface or moves a finger in proximity of or above the shortcut interface. This will be described in detail with reference to FIGS. 8 and 9.

Figure 8:
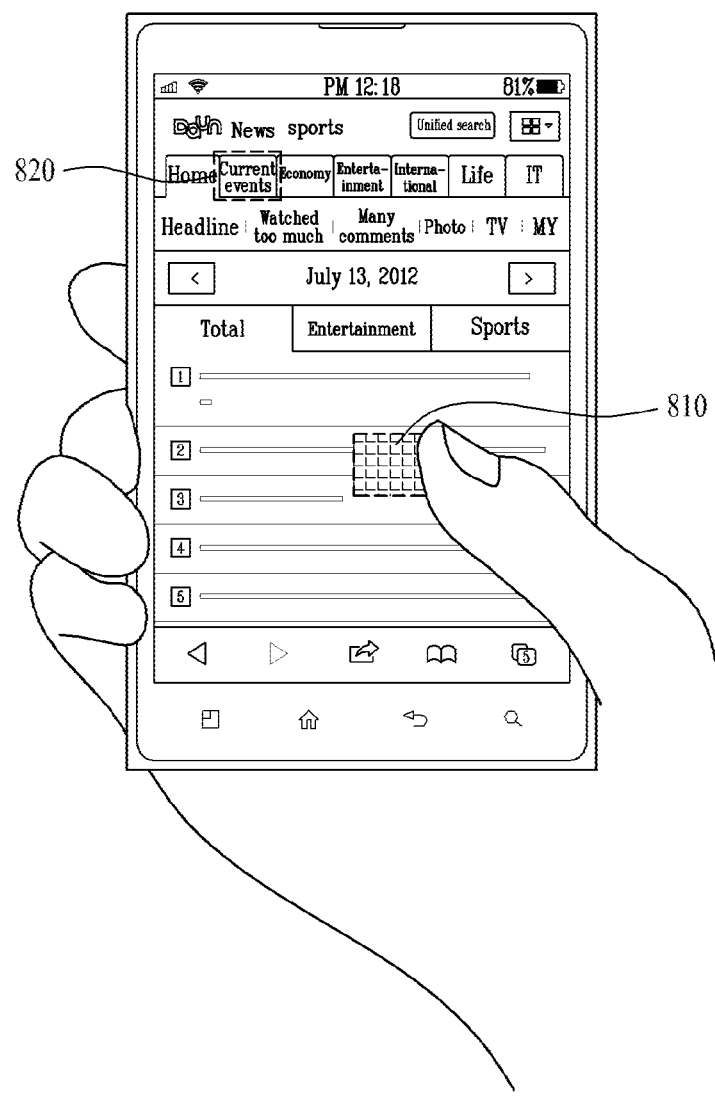
FIG. 8 is a diagram showing an example of executing a shortcut interface in a mobile device according to the present invention.

FIG. 8 is a diagram showing an embodiment of executing a shortcut interface in a mobile device according to the present invention.

As shown in FIG. 8, when the user touches a region 810 in which a shortcut interface has been previously set using a finger, the mobile device may provide a tactile feedback according to the texture information set with respect to the shortcut interface. Here, in addition to or in lieu of the user's touch of the shortcut interface, when the user places a finger in proximity distance of the shortcut interface above the shortcut interface, the mobile device using a proximity sensor may detect this as the touch to the shortcut interface. Here although the region in which the shortcut interface is set is shown in FIG. 8, this is only shown for easy understanding of the disclosure, and the set shortcut interface in actuality according to the present invention is not displayed to the user on the screen and is invisible to the user. However, the user can feel and recognize the presence of the shortcut interface due to the tactile feedback associated with the shortcut interface, when the user touches the region 810.

At this time, the user may confirm that the shortcut interface is set in the touched region 810 via the tactile feedback. Thus, when the user touches once the region 810 in which the shortcut interface is set in order to execute the shortcut interface (i.e., activate the shortcut), the mobile device executes the operation according to the selected item.

When the user touches the shortcut interface of the item in order to execute the shortcut interface, the mobile device may provide a visual feedback for the item corresponding to the shortcut interface. Visual feedback refers to a visual effect which appears when the item is actually selected such that the user feels as though they are a real item. Accordingly, the visual feedback may include a visual effect in which the item is pressed when being selected, or a highlight effect 820 as shown in FIG. 8. For instance, when the user touches the shortcut interface of the item (e.g., Current Events icon) in the region 810 in FIG. 8, the original Current Events icon is displayed with the highlight effect 820 so that the user can recognize the item being selected via the shortcut interface.

Figure 9:
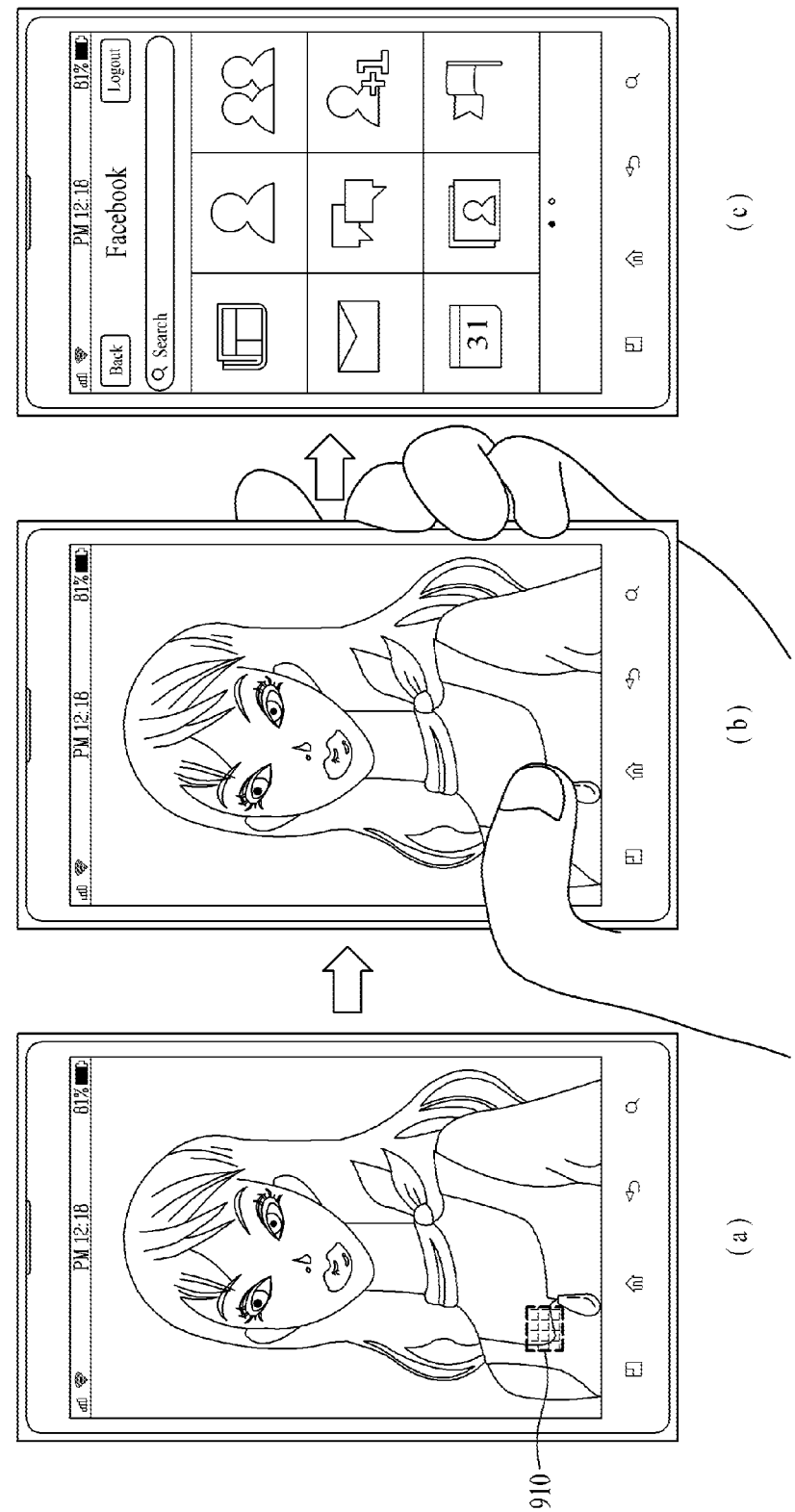
FIG. 9 is a diagram showing another example of executing a shortcut interface in a mobile device according to the present invention.

FIG. 9 is a diagram showing another embodiment of executing a shortcut interface in a mobile device according to the present invention.

As shown in FIG. 9(*a*), even when the user views a photo stored in the mobile device on the display screen of the mobile device, an already set shortcut interface may be present in a region 910 of the display screen. Although the region 910 in which the shortcut interface is set is shown in FIG. 9(*a*), this is done only for better understanding of description and the set region 910 or the set shortcut interface is invisible to the user. Further since the shortcut interface is invisible, it is possible to provide the shortcut interface to the user without preventing the user from viewing the photo.

At this time, as shown in FIG. 9(*b*), when the user touches the region 910 in which the shortcut interface has been set, the mobile device provides a tactile feedback in response to the user's touch. For instance, as the user initially touches or slides the finger over the region 910, the user may feel tactile sensation, vibration, or other tactile feedback. The user then may perceive that the shortcut interface is present via this tactile feedback and then touch the shortcut interface area (910) once more in order to execute the shortcut interface.

The mobile device which detects the user's execution input to the shortcut interface executes the item corresponding to the shortcut interface. Then, as shown in FIG. 9(*c*), the item corresponding to the shortcut interface is executed and the mobile device displays a user interface corresponding to the item. In this example, the item is the Facebook icon and thus the execution of the shortcut interface of the item causes the opening of the Facebook website on the mobile display. Here, the mobile device may provide the user interface using link information or execution information stored in the storage unit in association with the item.

According to an embodiment, the user may recognize the shortcut interface via the tactile feedback without switching a screen while executing another application or utilizing contents. Accordingly, the user may immediately execute a desired item by performing a simple touch operation.

According to an embodiment, the shortcut interface provided by the mobile device according to the present invention may include an active mode and an inactive mode. In the inactive mode, the mobile device does not provide any tactile feedback for the shortcut interface even when the user touches the region in which the shortcut interface is set.

For example, if the item is hypertext, the active mode may be set only when an application is executed, in order to increase user convenience. If the item corresponds to an application or an icon for performing a specific function of the mobile device, the active mode may be always set, in order to increase user convenience.

Accordingly, the mobile device according to the present invention may set the mode of the shortcut interface to the active mode or the inactive mode according to a predetermined condition. The predetermined condition may be determined by at least one of the kind of the item corresponding to the shortcut interface, user settings and an execution time of the shortcut interface.

Figure 10:
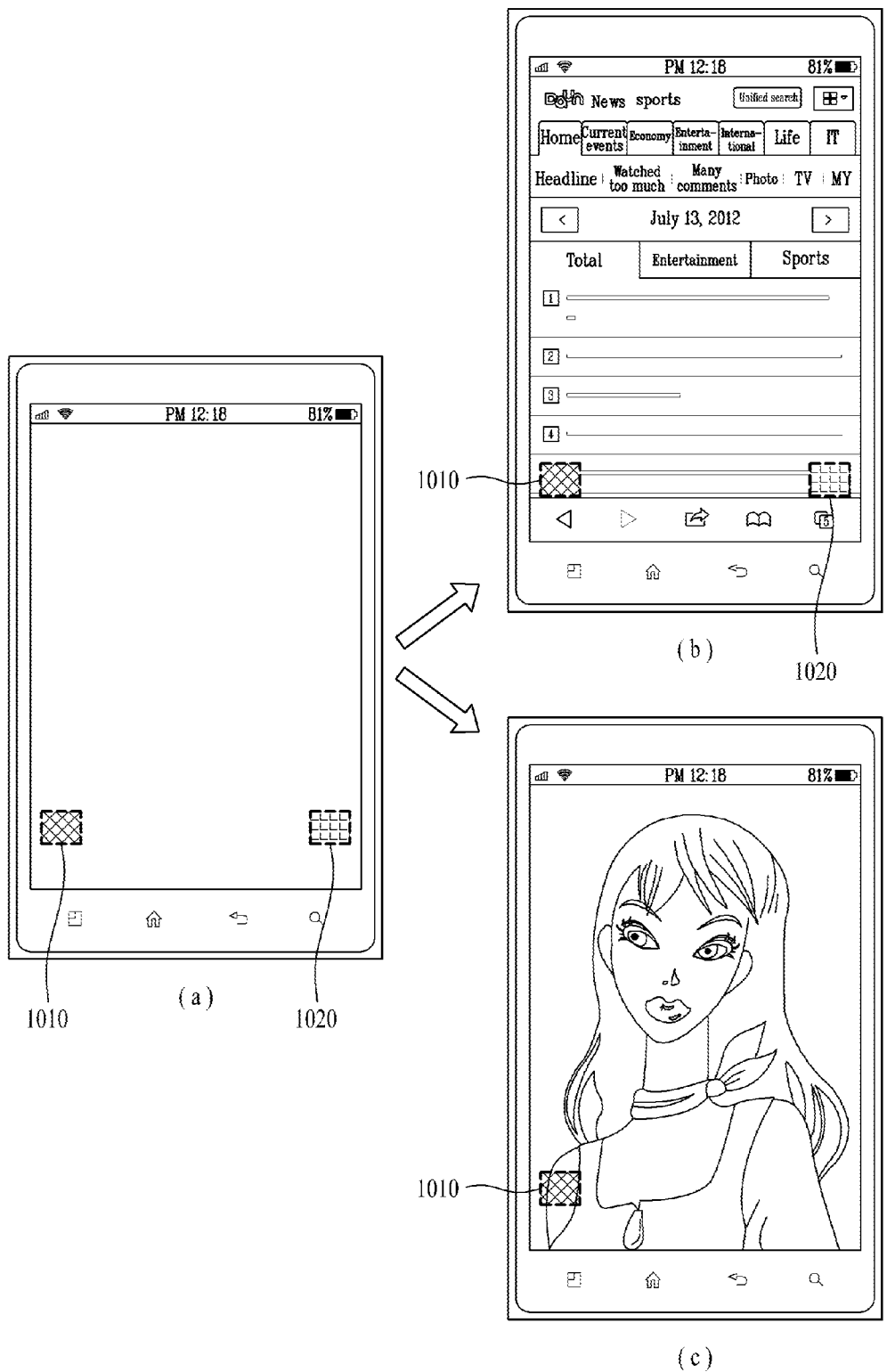
FIG. 10 is a diagram showing an example of a shortcut interface mode in a mobile device according to the present invention.

FIG. 10 is a diagram showing an example of a shortcut interface mode in a mobile device according to the present invention. Here the mode of the shortcut interface is changed according to the kind of the item corresponding to the shortcut interface.

If the kind of the item corresponding to the shortcut interface is hypertext, it is assumed that the active mode is set for the shortcut interface only when an application including the hypertext is executed and, otherwise, the inactive mode is set for the shortcut interface. If the kind of the item corresponding to the shortcut interface is an icon corresponding to an application, it is assumed that the active mode is always set.

As shown in one example of FIG. 10(*a*), if an icon corresponding to the application (item) is set as a shortcut interface 1010 on the display screen of the mobile device according to the methods discussed hereinabove, the shortcut interface 1010 is always in the active mode regardless of which application is being executed or which content is being displayed in the mobile device, as shown in FIGS. 10(*b*) and 10(*c*). Accordingly, when the user touches the shortcut interface 1010, the user always receives a tactile feedback accordingly and then can immediately execute the item using the shortcut interface 1010.

In contrast, as shown in another example of FIG. 10(*a*), if an icon corresponding to hypertext is set as a shortcut interface 1020 according to the present invention, the shortcut interface 1020 is in the active mode only when an application including the hypertext is being executed as shown in FIG. 10(*b*). However, when the user executes another application or other content, the mode of the shortcut interface 1020 is changed to the inactive mode. The controller can automatically change the mode of the shortcut interface 1020 between the active and inactive modes. Thus, the user may not receive a tactile feedback of the shortcut interface 1020 even when the user touches the shortcut interface 1020 on the display screen and is not able to immediately execute the item using the shortcut interface 1020.

The mobile device may change the modes of the shortcut interface according to a time when the shortcut interface is set or is being used, or according to other conditions. For example, the active mode for a specific shortcut interface may be automatically activated during a bedtime of the user such that the user can immediately execute a desired item using the corresponding shortcut interface (e.g., in the dark) and its tactile feedback without having to view the item.

Even when the item is hypertext, the active mode may be activated anytime if the user frequently uses the item. That is, the mode of the mobile device may be set according to user settings.

Figure 11:
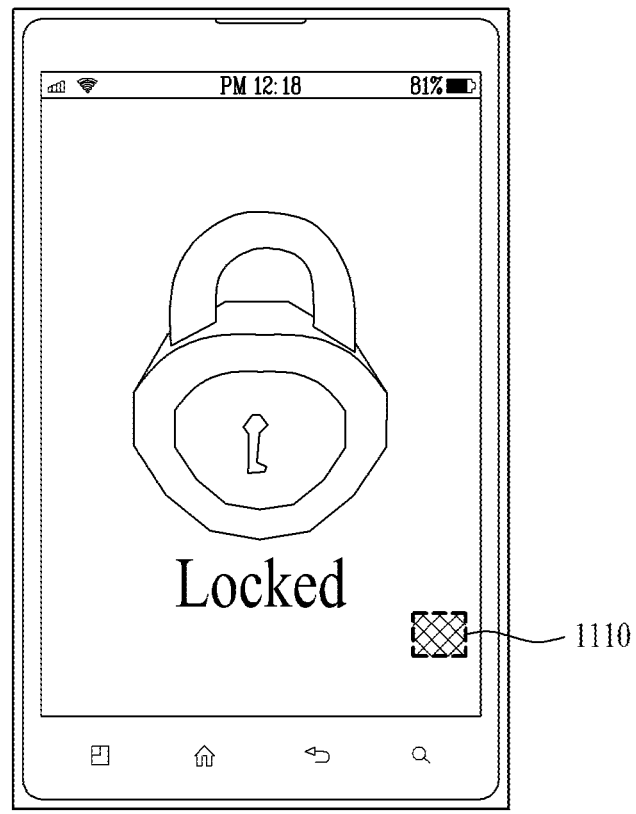
FIG. 11 is a diagram showing an example of an active mode of a shortcut interface in a mobile device according to the present invention.

FIG. 11 is a diagram showing an embodiment of an active mode of a shortcut interface in a mobile device according to the present invention. As shown in FIG. 11, the mobile device may be set such that the set shortcut interface of an item in the active mode is immediately executed even while the mobile device is still in a locked state. Accordingly, the item may be immediately executed using the shortcut interface of the item even when the locked state of the mobile device is not changed to the unlocked state. That is, the mobile device may immediately execute the item while unlocking the mobile device and may display a graphical user interface when the item is executed.

In other words, when the mobile device enters a lock mode after the shortcut interface has been set, the mobile device may detect a touch input of user to the shortcut interface. The mobile device may unlock and execute an operation associated with the shortcut interface of the item.

In case of FIG. 11, however, the security of the mobile device may be deteriorated. Accordingly, if the mobile device detects the user's touch inputs in order to improve security, the mobile device is unlocked and, at the same time, the item corresponding to the shortcut interface is immediately executed in response to the activation of the shortcut interface only after the user is identified through a fingerprint verification or only after some authentication has been performed, e.g., verification of the user's ID and/or pas sc ode.

Up to now, selection of one item for setting the shortcut interface thereof has been described. However, the mobile device according to the present invention can provide one or more shortcut interfaces for a plurality of different items.

As an embodiment of setting a shortcut interface for a plurality of items, there is a method of repeatedly performing a process of setting a shortcut interface for each of the items. However, the method of setting the shortcut interface for the plurality of items by the repeated operation is inconvenient. In particular, if the items, the shortcut interfaces of which are set, are adjacent to teach, inconvenience is increased. Hereinafter, an embodiment of simply setting a shortcut interface for a plurality of items according to the present invention will be described in detail with reference to FIGS. 12A-12C.

Figure 12A:
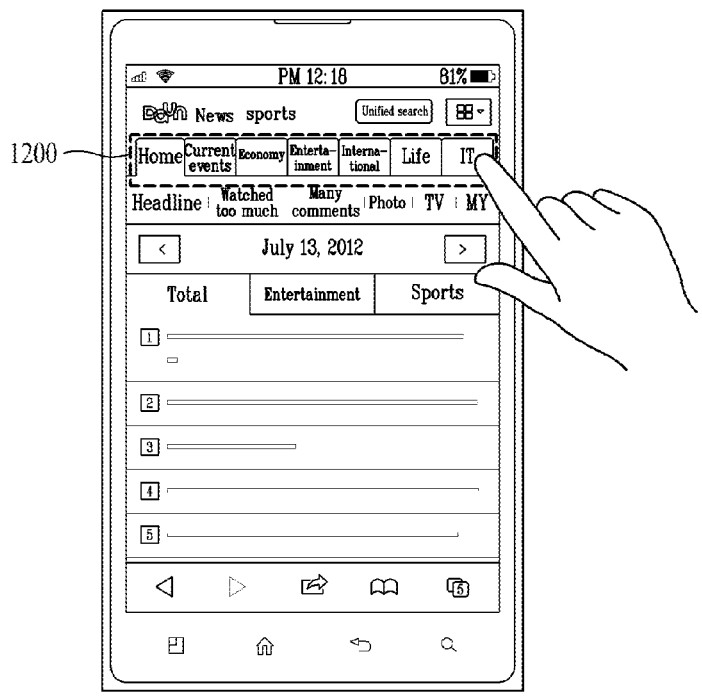
FIG. 12A is a diagram showing an embodiment of setting a shortcut interface for a plurality of items in a mobile device according to the present invention.

FIG. 12A is a diagram showing an embodiment of setting shortcut interfaces for a plurality of items in a mobile device according to the present invention.

As shown in FIG. 12A, when the user selects an item, for which a shortcut interface will be set, a region (a first region on the display screen) may set such that a plurality of items is selected once. The mobile device provides a virtual image 1200 of the selected items, receives a touch input for moving the virtual image to a second region on the screen, and sets a shortcut interface for the selected items in the second region, as described above with reference to FIGS. 4 and 5. At this time, the set shortcut interface may provide a shortcut to a page on which a plurality of items is displayed or shortcuts respectively to the plurality of items.

Figure 12B:
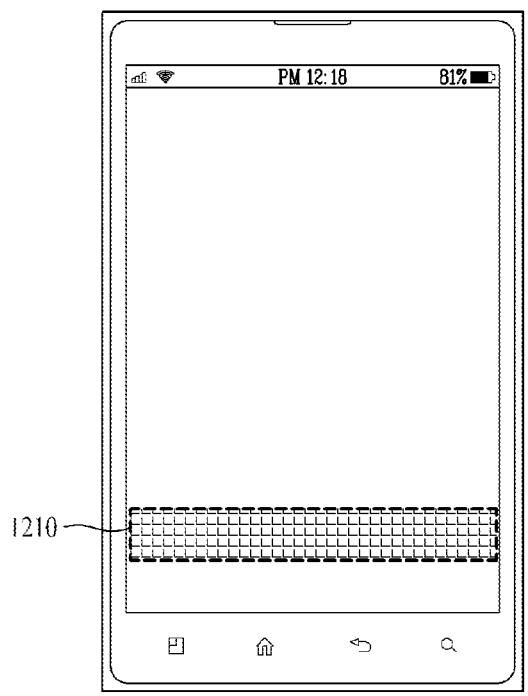
FIG. 12B is a diagram showing an embodiment of providing a shortcut interface for a plurality of items in a mobile device according to the present invention.

FIG. 12B is a diagram showing an embodiment of providing a shortcut interface for a plurality of items in a mobile device according to the present invention, which shows the example of the shortcut interface set in FIG. 12A.

The mobile device may provide a shortcut to a page, in which a plurality of items is displayed, with respect to a shortcut interface including the plurality of items. Accordingly, as shown in FIG. 12B, one tactile feedback representative of the plurality of items may be provided when the user touches the shortcut interface.

For instance, as shown in FIG. 12B, the shortcut interface of the plurality of items selected may be set in a region 1210 of the display screen. This shortcut interface, as in the other embodiments, is not visible to the user since it is not displayed on the screen of the mobile device. When the user touches the region 1210 in which the shortcut interface is set, the mobile device may provide a tactile feedback in response to the touch so that the user can know the presence of the shortcut interface in the region 1210. When the user performs the touch input again in the region 1210, the mobile device executes the shortcut interface by providing the shortcut to the page shown in FIG. 12A. That is, when the mobile device is in the state of FIG. 12B, the user can touch the region 1210 in a certain way to execute the shortcut interface in the region 1210, which in turn can mean displaying the page of FIG. 12A.

The embodiment of FIG. 12B is particularly useful when a plurality of items, such as a web page main screen and a home screen, both of which are frequently used, is displayed and the frequencies of using the plurality of items are similar.

Figure 12C:
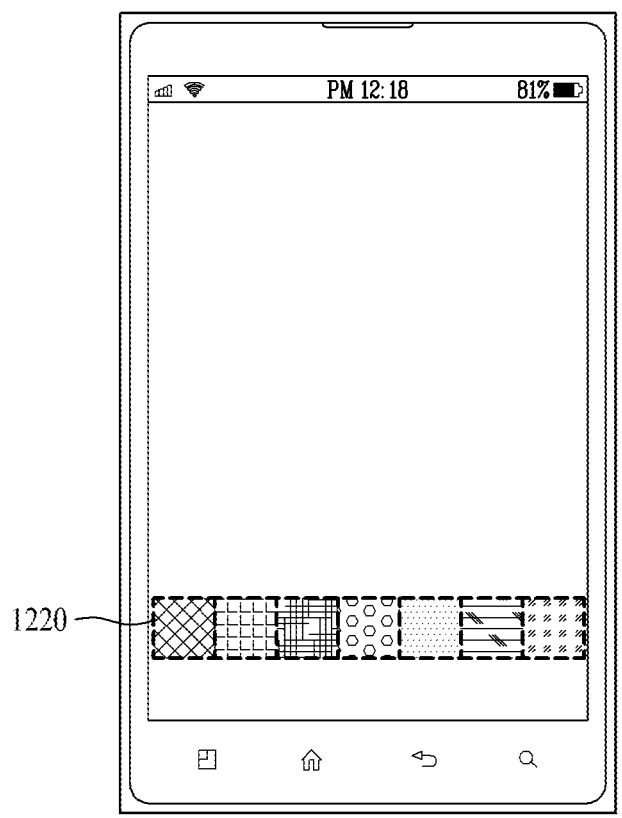
FIG. 12C is a diagram showing another embodiment of providing a shortcut interface for a plurality of items in a mobile device according to the present invention.

FIG. 12C is a diagram showing another embodiment of providing a shortcut interface for a plurality of items in a mobile device according to the present invention, which shows another example of the shortcut interface set in FIG. 12A.

The mobile device may provide respective shortcuts for the plurality of items to the shortcut interface including the plurality of items. Accordingly, as shown in FIG. 12C, it is possible to provide respective tactile feedbacks for the plurality of items. That is, a plurality of different shortcut interfaces corresponding respectively to the plurality of different items selected can be set in a region 1220 of the screen of the mobile terminal. Each of the shortcut interfaces can be selectively and independently selected and activated to execute a corresponding one of the items selected.

When the user touches the region 1220 in which the shortcut interface of FIG. 12C is set, a tactile feedback is changed according to the region corresponding to the item. That is, texture information corresponding to each of the items is differently set so as to provide respective tactile feedbacks for the plurality of items. Different tactile feedbacks may be provided for the different shortcut interfaces. Accordingly, the user may select a desired item via the tactile feedbacks and immediately execute a shortcut corresponding to the desired item.

In some situations, the user may wish to change the location of the set shortcut interface. However, since the shortcut interface provided by the mobile device according to the present invention is invisible, it may be difficult to change the location of the shortcut interface. Accordingly, the mobile device may display a virtual interface corresponding to the shortcut interface such that the shortcut interface becomes visible.

Figure 13:
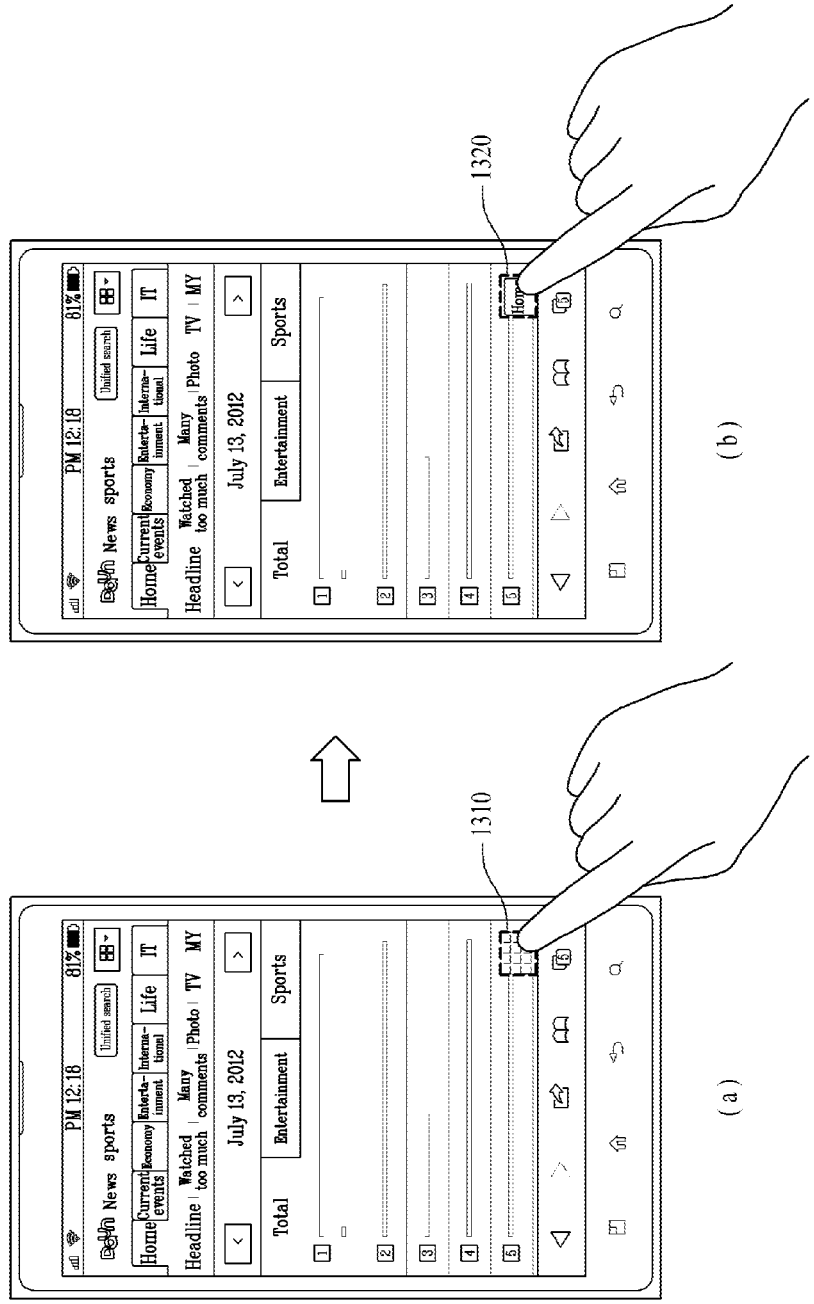
FIG. 13 is a diagram showing an embodiment of providing a virtual interface for a shortcut interface in a mobile device according to the present invention.

FIG. 13 is a diagram showing an embodiment of providing a virtual interface for a shortcut interface in a mobile device according to the present invention. In a region 1310 of the display screen of the mobile device, a shortcut interface for a selected item has been set according to the present invention.

Then as shown in FIG. 13(a), the user may perform an input for requesting a virtual interface of the region 1310 in which the shortcut interface is set. An input for requesting the virtual interface is not limited to a specific form. Accordingly, an input for requesting the virtual interface is performed by touching the region 1310, in which the shortcut interface is set, predetermined times or pressing a separate button.

Then as shown in FIG. 13(b), a virtual interface 1320 in correspondence with the input for requesting the virtual interface in FIG. 13(a) is visibly displayed on the screen to the user. As shown in FIG. 13(b), the virtual interface 1320 may be an image of an item corresponding to the shortcut interface. As such, upon the user's request, the shortcut interface which was previously invisible to the user can become visible to the user on the screen.

Although not shown in FIG. 13(b), the mobile device may display an image list obtained by changing at least one of color, pattern, texture and transparency of an image of an original item according to texture information for providing the tactile feedback and change the texture information of the shortcut interface to other texture information corresponding to an image selected by the user.

The virtual interface may display a configuration of the shortcut interface and the user may change the configuration of the shortcut interface via the virtual interface.

The configuration of the shortcut interface may include at least one of a location where the shortcut interface is set, the kind of an item corresponding to the shortcut interface, and texture information for providing a tactile feedback for the shortcut interface.

Figure 14A:
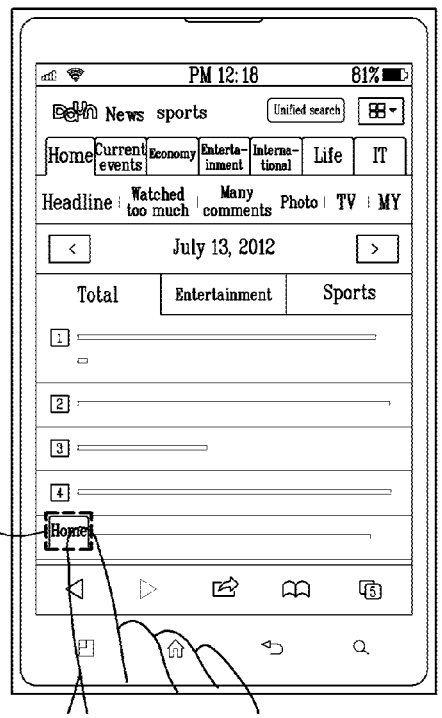
FIG. 14A is a diagram showing an example of changing an environment configuration of a shortcut interface via a virtual interface in a mobile device according to the present invention.

FIG. 14A is a diagram showing an embodiment of changing a configuration of a shortcut interface of an item via a virtual interface in a mobile device according to the present invention, which shows an example of changing the location of the shortcut interface using a virtual interface 1410. For instance, the user can move the virtual interface 1410 in order to move the location of the shortcut interface corresponding thereto.

Figure 14B:
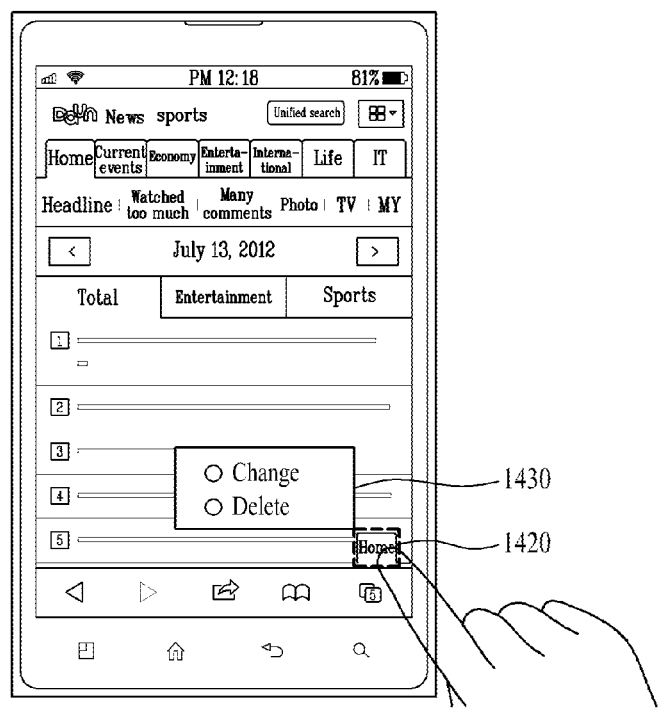
FIG. 14B is a diagram showing another example of changing an environment configuration of a shortcut interface via a virtual interface in a mobile device according to the present invention.

FIG. 14B is a diagram showing another embodiment of changing a configuration of a shortcut interface via a virtual interface in a mobile device according to the present invention. The virtual interface may include an image 1420 of an item corresponding to a shortcut interface and a message/menu box 1430 for changing the configuration of the shortcut interface.

The user may change the configuration of the shortcut interface via the message box 1430 for changing the configuration of the shortcut interface or delete the shortcut interface. Even when the user deletes the shortcut interface, the shortcut interface is a copy and thus an original item is not influenced by the deletion of the shortcut interface of the item.

Figure 15A:
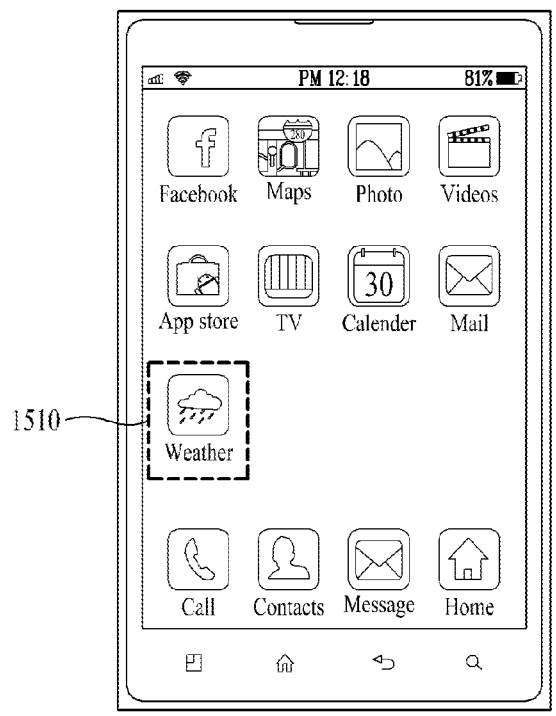
FIG. 15A is a diagram showing an embodiment in which a shortcut interface of a mobile device according to the present invention overlaps a currently displayed item.

FIG. 15A is a diagram showing an embodiment in which a shortcut interface of a mobile device according to the present invention overlaps a currently displayed item on the mobile device.

The screen displayed on the mobile device may be changed in real time and the displayed item and the location of the item may be changed. Thus, as shown in FIG. 15A, a shortcut interface 1510 of an item may overlap a currently displayed item 1511 which is different from the item of the shortcut interface 1510.

If such overlapping occurs, the mobile device may not recognize whether the user's touch input is the touch input for the shortcut interface 1510 or the touch input for the currently displayed item 1511.

Accordingly, when the mobile device detects the user's touch input, the touch input for the shortcut interface and the touch input for the currently displayed item may be differentiated by providing tactile feedbacks at predetermined time intervals.

Figure 15B:
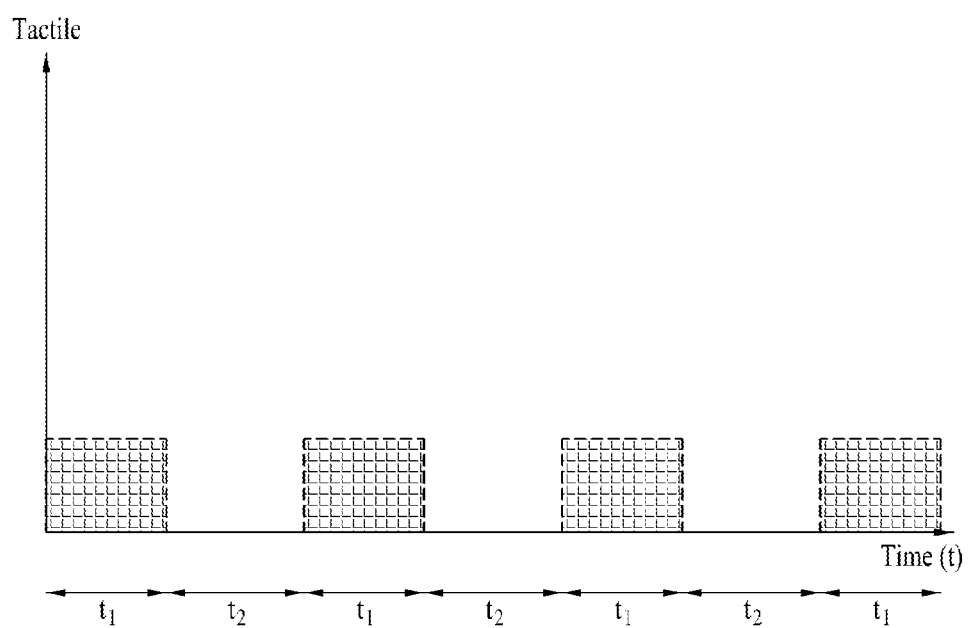
FIG. 15B is a diagram showing an example of providing a tactile feedback when a shortcut interface of a mobile device according to the present invention overlaps a currently displayed item.

FIG. 15B is a diagram showing such an example of providing a tactile feedback when a shortcut interface of a mobile device according to the present invention overlaps a currently displayed item of the mobile device.

As shown in FIG. 15B, the mobile device may provide tactile feedbacks at predetermined time intervals in correspondence with the user's touch input. That is, if a time period when a tactile feedback for the shortcut interface is provided is $t_1$ and a time period when the tactile feedback is not provided is $t_2$, the mobile device alternately repeat the state of $t_1$ and the state of $t_2$ when detecting the user's touch input to the display screen.

Accordingly, if the mobile device receives a touch input from the user when providing the tactile feedback ($t_1$), the mobile device may recognize the received touch input as the touch input for the shortcut interface 1510 and provide a shortcut corresponding to the item corresponding to the shortcut interface. In contrast, if the mobile device receives a touch input from the user when a tactile feedback is not provided ($t_2$), the mobile device may recognize the received touch input as the touch input for the currently displayed item 1511 and execute the currently displayed item 1511.

Figure 15C:
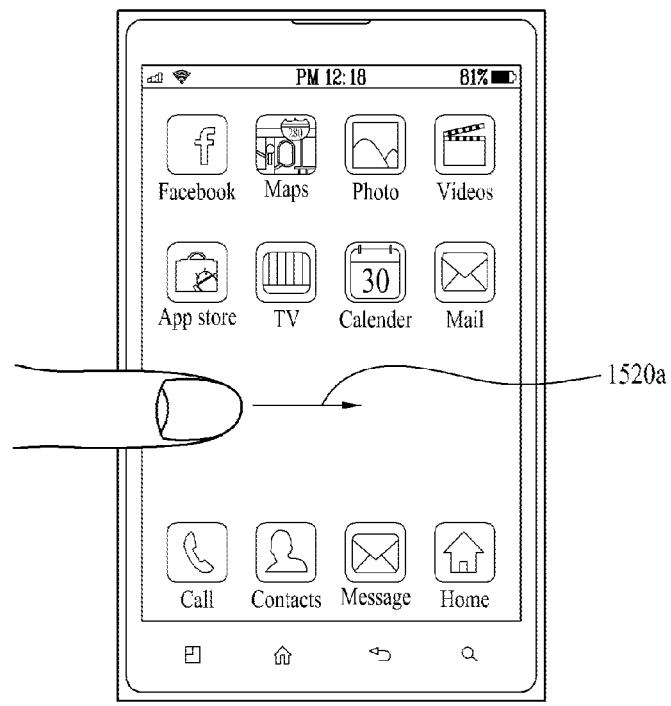
FIG. 15C is a diagram showing another example of providing a tactile feedback when a shortcut interface of a mobile device according to the present invention overlaps a currently displayed item.

FIG. 15C is a diagram showing another embodiment of providing a tactile feedback to the selection/touch of a shortcut interface of an item when the shortcut interface of a mobile device according to the present invention overlaps a currently displayed item of the mobile device.

As shown in FIG. 15C, the mobile device may receive and recognize a sliding touch input in a direction 1520*a* in a predetermined area as a touch input for the shortcut interface 1510, and receive and recognize a different touch input such as pressing or tapping on the area without directivity as a touch input for the currently displayed item 1511. The present invention is not limited to the example shown in FIG. 15C and any other touch input method may be included in the scope of the present invention so that touch inputs for the shortcut interface and for the currently displayed item may be distinguished.

Figure 15D:
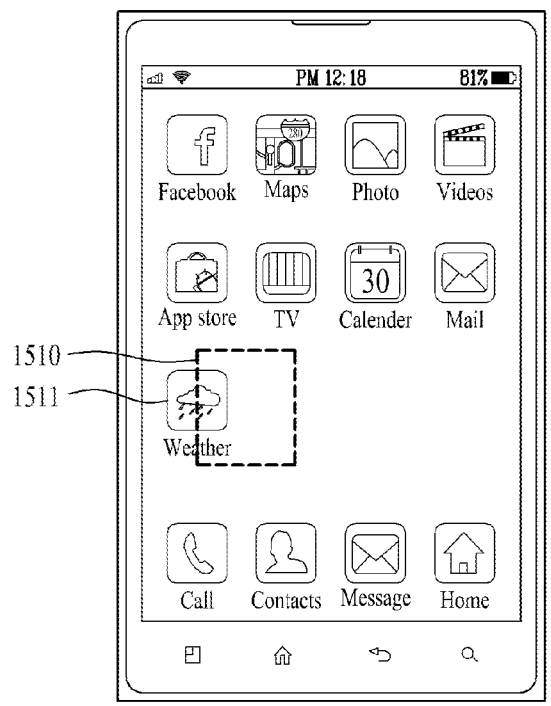
FIG. 15D is a diagram showing another example of providing a tactile feedback when a shortcut interface of a mobile device according to the present invention overlaps a currently displayed item.

FIG. 15D is a diagram showing another embodiment of providing a tactile feedback when a shortcut interface of a mobile device according to the present invention overlaps a currently displayed item on the mobile device.

In such overlapping situation, as shown in FIG. 15D, the mobile device may change the location of the shortcut interface 1510 in a predetermined range such that the shortcut interface does not overlap the currently displayed item, if the shortcut interface 1510 overlaps at least one currently displayed item 1511. However, if the mobile device arbitrarily and automatically changes the location of the shortcut interface, the user may be thrown into confusion. Accordingly, in order to minimize confusion to the user, the location of the shortcut interface may be changed by the mobile device so as not to overlap the currently displayed item 1511 entirely.

For example, as shown in FIG. 15D, the mobile device may change the location of the shortcut interface such that the shortcut interface partially overlaps the currently displayed item. This may be done automatically by the mobile device without any initiation or input from the user. In addition, the mobile device may newly set the location of the shortcut interface within a range in which the area occupied by the shortcut interface is minimally shared. As a result, the user can separately perform a touch input for the shortcut interface and a touch input for the currently displayed item.

In FIGS. 15A to 15D, the case where the shortcut interface overlaps one item was described as an embodiment. If the shortcut interface is for a plurality of items, the shortcut interface may overlap the plurality of items and, in this case, the same method of FIGS. 15A-15D may be applied.

Figure 16:
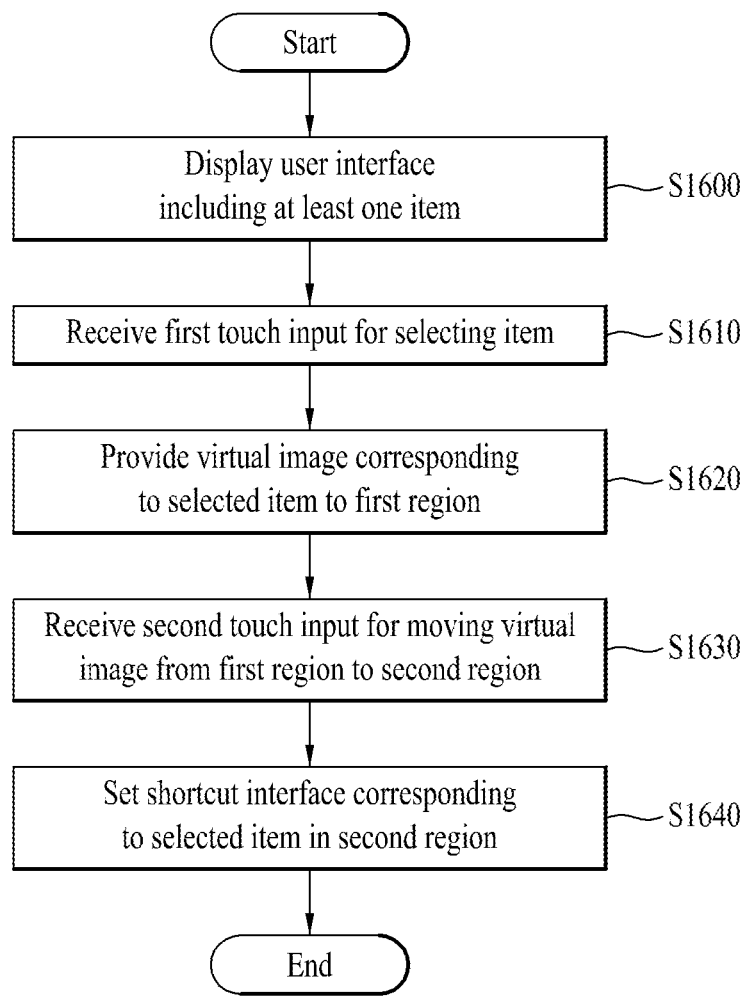
FIG. 16 is a flowchart illustrating a method for controlling a mobile device according to an embodiment of the present invention.

FIG. 16 is a flowchart illustrating a method for controlling a mobile device according to an embodiment of the present invention. The method of controlling the mobile device will be described with reference to FIG. 16. This method can be implemented in any of the mobile device discussed herein or in other suitable devices.

First, as described above with reference to FIGS. 3A and 3B, the mobile device may display a user interface including at least one item on a display screen of the mobile device (S1600). The item may include at least one of icons corresponding to hypertexts, applications, operations, menus, etc.

As described above with respect to FIGS. 4 to 6, the mobile device may receive a first touch input for selecting an item among the displayed item (S1610). The first touch input is a touch input for setting the shortcut interface of the selected item and the shortcut interface may provide a shortcut to the selected item, i.e., a shortcut to activating or executing the selected item.

As described above with reference to FIGS. 4 to 6, the mobile device may provide a virtual image corresponding to the selected item at a first region on the display screen (S1620). The virtual image is displayed such that the image corresponding to the selected item is distinguished from peripheral graphic images, and represents the selected item whose shortcut interface is soon to be set. In addition, the virtual image may include a highlighted item image, a bright item image, or a duplicate image of the selected item such that the user becomes aware that the item has been selected.

The mobile device may then receive a second touch input for moving the virtual image from the first region to a second region on the display screen (S1630). As described above with respect to FIG. 4, the second touch input is a touch input for dragging and dropping the virtual image from the first region to the second region. As described above with reference to FIG. 5, the second touch input may be the touch input for selecting a specific region from among one or more regions provided by the mobile device as the second region.

Then the mobile device may set the shortcut interface corresponding to the selected item in the second region (S1640). In addition, the mobile device may set texture information of a tactile feedback to be provided for the shortcut interface. At this time, the mobile device may set predetermined texture information according to at least one of pressure and speed of drag input for moving the virtual image from the first region to the second region by the user.

Through such a process, the mobile device may detect a third touch input of the user for the set shortcut interface and provide the tactile feedback and visual feedback to the user in response to the third touch input to the shortcut interface, as described above with reference to FIG. 8.

In some cases, the shortcut interface may overlap at least one currently displayed item. As described above with reference to FIG. 15C, the mobile device may recognize the received touch input as a fourth touch input for the shortcut interface if the received touch input is a sliding input in a predetermined area. Alternatively, as described above with reference to FIG. 15B, the mobile device provides tactile feedbacks set for the shortcut interface at predetermined intervals in correspondence with the fourth touch input and indicates that the shortcut interface overlaps the item. Alternatively, as described above with reference to FIG. 15D, the mobile device may change the location of the shortcut interface within a predetermined range such that the user can distinguish between the shortcut interface and the currently displayed item.

As described above with reference to FIG. 9, the mobile device may detect a fifth touch input for the shortcut interface, execute an operation according to the item corresponding to the shortcut interface, and provide a shortcut accordingly.

As described above with reference to FIGS. 10 to 11, the shortcut interface can include an active mode and an inactive mode and the mode of the shortcut interface may be changed according to a predetermined condition.

As described above with reference to FIG. 12A, the mobile device may set at least one shortcut interface corresponding to a plurality of items. At this time, the shortcut interface provides a shortcut to a page on which the plurality of items is displayed and provides one tactile feedback representative of the plurality of items as described above with reference to FIG. 12B. Alternatively, the shortcut interface can provide respective/different shortcuts for the plurality of items and can provide respective/different tactile feedbacks for the plurality of items.

According to an embodiment of the present invention, since the user can manipulate the mobile device using one hand regardless of the size of the display/mobile device, it is possible to increase user convenience.

According to another embodiment of the present invention, since the shortcut for an item located in a region which is not touchable by the user's hand is provided, the user can conveniently and rapidly manipulate the mobile device.

According to another embodiment of the present invention, since the mobile device provides a shortcut interface in the form of an invisible tactile feedback, the user may conveniently manipulate the mobile device without blocking the user's view.

Although the embodiments shown in the drawings are separately described for convenience of description, the embodiments may be combined into a new embodiment. If necessary, a computer-readable recording medium having a program recorded thereon for executing the above-described embodiments is included in the scope of the present invention.

The mobile device and the method for controlling the same according to the foregoing embodiments are not restricted to the embodiments set forth herein. Therefore, variations and combinations of the exemplary embodiments set forth herein may fall within the scope of the present invention.

The method for controlling the mobile device according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Both the product invention and the process invention are described in the specification and the description of both inventions may be supplementarily applied as needed.

What is claimed is:

1. A method for controlling an electronic device including a display, the method comprising:
    displaying, on the display, a user interface including at least one item;
    receiving a first touch input to the user interface for selecting a first item from the displayed at least one item, wherein the first touch input is for setting a shortcut interface of the selected first item, and the shortcut interface provides a shortcut to the selected first item;
    temporarily displaying a virtual image corresponding to the selected first item in a first region of the display based on the first touch input, wherein the virtual image is displayed to distinguish the selected first item from a surrounding image of the selected first item;
    receiving a second touch input to the user interface for moving the virtual image from the first region to a second region on the display or for selecting the second region in the display;
    setting the shortcut interface of the selected first item at the second region based on the second touch input; and
    changing the set shortcut interface invisible and providing a tactile feedback on the second region,
    wherein the invisible shortcut interface is movable on the display by a third touch input to the display even after the shortcut interface is set at the second region, and
    wherein when the invisible shortcut interface is moved, the invisible shortcut interface is temporarily changed to be visible only while the invisible shortcut interface is relocated from the second region to a third region on the display by the third touch input.

2. The method according to claim 1, wherein the selected first item is a hypertext or at least one of icons corresponding to applications.

3. The method according to claim 1, wherein the setting step sets the shortcut interface at the second region which is a location to which the virtual image is moved from the first region by the second touch input.

4. The method according to claim 1, wherein, if the shortcut interface is set at the second region which overlaps at least one currently displayed item, the third touch input includes a sliding touch input in the second region.

5. The method according to claim 1, wherein, if the shortcut interface is set at the second region which overlaps at least one currently displayed item, the step of providing the tactile feedback includes providing tactile feedbacks at predetermined time intervals.

6. The method according to claim 1, further comprising:
if the shortcut interface is set at the second region which overlaps at least one currently displayed item, moving the location of the shortcut interface within a predetermined range.

7. The method according to claim 1, further comprising:
setting texture information of the tactile feedback prior to the step of providing the tactile feedback.

8. The method according to claim 7, wherein the step of setting the texture information of the tactile feedback includes setting predetermined texture information according to at least one of a pressure and speed of a drag input of the second touch input for moving the virtual image from the first region to the second region.

9. The method according to claim 1, wherein:
a mode of the shortcut interface is changed between an active mode and an inactive mode according to a predetermined condition, and
the predetermined condition is determined by at least one of a kind of the selected first item, user settings and an execution time.

10. The method according to claim 1, further comprising:
detecting a fourth touch input to the shortcut interface; and
executing an operation associated with the shortcut interface of the selected first item based on the fourth touch input.

11. The method according to claim 1, wherein the selected first item includes a plurality of different items displayed on the display.

12. The method according to claim 11, wherein the shortcut interface provides a shortcut to a page on which the plurality of different items is displayed, and provides one tactile feedback representative of the plurality of different items.

13. The method according to claim 11, wherein the shortcut interface provides a plurality of shortcuts to the plurality of different items, respectively and provides a plurality of tactile feedbacks to the plurality of different items, respectively.

14. The method according to claim 1, wherein when the electronic device enters a lock mode after the shortcut interface has been set, the method further comprises:
detecting a fifth touch input to the shortcut interface; and
based on the fifth touch input, unlocking the electronic device and then executing an operation associated with the shortcut interface of the selected first item.

15. An electronic device comprising:
a display; and
a controller configured to:
display, on the display, a user interface including at least one item;
receive a first touch input to the user interface for selecting a first item from the displayed at least one item, wherein the first touch input is for setting a shortcut interface of the selected first item, and the shortcut interface provides a shortcut to the selected first item;
temporarily display a virtual image corresponding to the selected first item in a first region of the display based on the first touch input, wherein the virtual image is displayed to distinguish the selected first item from a surrounding image of the selected first item;
receive a second touch input to the user interface for moving the virtual image from the first region to a second region on the display or for selecting the second region in the display;
set the shortcut interface of the selected first item at the second region based on the second touch input; and
change the set shortcut interface invisible and provide a tactile feedback on the second region,
wherein the invisible shortcut interface is movable on the display by a third touch input to the display even after the shortcut interface is set at the second region, and
wherein when the invisible shortcut interface is moved, the invisible shortcut interface is temporarily changed to be visible only while the invisible shortcut interface is relocated from the second region to a third region on the display by the third touch input.

16. The electronic device according to claim 15, wherein the selected first item is a hypertext or at least one of icons corresponding to applications.

17. The electronic device according to claim 15, wherein the controller sets the shortcut interface at the second region which is a location to which the virtual image is moved from the first region by the second touch input.

18. The electronic device according to claim 15, wherein, if the shortcut interface is set at the second region which overlaps at least one currently displayed item, the third touch input includes a sliding touch input in the second region.

19. The electronic device according to claim 15, wherein, if the shortcut interface is set at the second region which overlaps at least one currently displayed item, the controller provides the tactile feedback by providing tactile feedbacks at predetermined time intervals.

20. The electronic device according to claim 15, wherein the controller is further configured to:
move the location of the shortcut interface within a predetermined range, if the shortcut interface is set at the second region which overlaps at least one currently displayed item.

21. The electronic device according to claim 15, wherein the controller is further configured to:
set texture information of the tactile feedback prior to the providing the tactile feedback.

22. The electronic device according to claim 15, wherein the controller changes a mode of the shortcut interface between an active mode and an inactive mode according to a predetermined condition, and
the predetermined condition is determined by at least one of a kind of the selected first item, user settings and an execution time.

23. The electronic device according to claim 15, wherein the controller is further configured to:
detect a fourth touch input to the shortcut interface; and
execute an operation associated with the shortcut interface of the selected first item based on the fourth touch input.

24. The electronic device according to claim 15, wherein when the electronic device enters a lock mode after the shortcut interface has been set, the controller is further configured to:
detect a fifth touch input to the shortcut interface; and
based on the fifth touch input, unlock the electronic device and then execute an operation associated with the shortcut interface of the selected first item.

* * * * *